United States Patent [19]

Westeppe et al.

[11] Patent Number: 5,340,876

[45] Date of Patent: * Aug. 23, 1994

[54] THERMOPLASTIC MOULDING COMPOUNDS OF POLYAMIDES AND RESIN COPOLYMERS

[75] Inventors: Uwe Westeppe, Remscheid; Klaus Struss; Christian Lindner, both of Cologne; Karsten-Josef Idel; Hans-Joachim Laue, both of Krefeld, all of Fed. Rep. of Germany

[73] Assignee: Bayer Aktiengesellschaft, Leverkusen, Fed. Rep. of Germany

[*] Notice: The portion of the term of this patent subsequent to Apr. 23, 2008 has been disclaimed.

[21] Appl. No.: 88,415

[22] Filed: Jul. 7, 1993

Related U.S. Application Data

[63] Continuation of Ser. No. 792,428, Nov. 15, 1991, abandoned, which is a continuation of Ser. No. 167,553, Mar. 14, 1988, abandoned.

[30] Foreign Application Priority Data

Mar. 24, 1987 [DE] Fed. Rep. of Germany ....... 3709599

[51] Int. Cl.$^5$ ................. C08L 77/00; C08L 33/06; C08L 25/14
[52] U.S. Cl. ..................... 525/66; 525/179; 525/183
[58] Field of Search .................. 525/66, 179, 183

[56] References Cited

U.S. PATENT DOCUMENTS

| | | | |
|---|---|---|---|
| 3,974,234 | 8/1976 | Brinkman | 525/66 |
| 4,321,336 | 3/1982 | Meyer | 525/183 |
| 4,338,406 | 6/1982 | Sanderson | 525/183 |
| 4,655,964 | 4/1987 | Steinberger | 524/445 |
| 5,010,138 | 4/1991 | Westeppe | 525/179 |

FOREIGN PATENT DOCUMENTS 2582659 12/1986 France .

*Primary Examiner*—David Buttner
*Attorney, Agent, or Firm*—Connolly & Hutz

[57] ABSTRACT

This invention relates to thermoplastic moulding compounds with improved properties, in particular with reduced water absorption and rigidity and improved impact strength, from polyamides A and a thermoplastic resin copolymer B containing at least one (meth)acrylic acid ester of a tertiary alcohol in quantities of up to 35% by weight in addition to the other monomers such as styrene or (meth)acrylic esters. The invention also relates to rigid moulding compounds which are tough at low temperatures and are obtained from polyamides and the thermoplastic resin copolymers defined above and in addition contain a rubber polymer C in quantities of up to 35% by weight.

19 Claims, No Drawings

THERMOPLASTIC MOULDING COMPOUNDS OF POLYAMIDES AND RESIN COPOLYMERS

This is a continuation of Ser. No. 07/792,428, filed Nov. 15, 1991 now abandoned, which is a continuation of copending application Ser. No. 167,553, filed Mar. 14, 1988, abandoned.

This invention relates to new thermoplastic moulding compounds which are obtained from partially crystalline (semicrystalline) or amorphous polyamides A and thermoplastic resin copolymers B and contain at least one copolymerisable (meth)acrylic acid ester of a tertiary alcohol and optionally also a rubber polymer C in quantities of up to 35% by weight.

Owing to their high abrasion resistance and chemical resistance and great toughness which can be even further increased to a considerable extent by modification with rubber, polyamides are used as materials for moulded parts which are subjected to severe conditions in use. One disadvantage of polyamides, however, is their absorption of water and resulting loss of rigidity.

Thermoplastic resin polymers prepared from (substituted) styrene(s) acrylonitrile and/or acrylic acid esters have good processing characteristics as well as high dimensional stability but their heat distortion temperature and chemical resistance leave room for improvement.

DE-AS 3 120 803 discloses moulding compounds of polyamides, graft copolymers and olefine copolymers which contain a (high) proportion of acid groups. The impact strength is improved.

EP-A 0 049 103 describes polymers of a polyamide and vinyl copolymer which contain esters and an imide of an α,ω-unsaturated dicarboxylic acid and have inter alia high dimensional stability, chemical resistance, heat resistance and abrasion resistance.

U.S. Pat. No. 4,496,690 discloses mixtures of polyamide, graft polymers and a terpolymer of styrene, acrylonitrile and an unsaturated carboxylic acid amide which have improved miscibility, heat distortion resistance and notched impact strength.

DE-A 2 403 889 teaches that products obtained by mixing amorphous polyamides, styrene copolymers which have been modified to increase their impact strength, and acrylic acid derivatives have advantageous mechanical properties. The preferred acrylic acid derivatives are acrylonitrile and esters of primary and secondary alcohols.

DE-AS 1 669 702 discloses polyamide moulding compounds with improved impact strength which contain from 1 to 40% by weight of copolymers of olefines and (meth)acrylic acid esters of a tertiary alcohol. These products, however, are not sufficiently tough.

DE-A 2 941 025 teaches that the toughness of polyamides can be considerably improved, in particular by mixing them with graft rubbers based on polybutadiene containing a sheath of acrylic acid esters of primary an secondary alcohols and in addition (meth)acrylic acid t-butyl ester.

It has now surprisingly been found that highly compatible moulding compounds may be prepared from a polyamide A and a thermoplastic resin copolymer B if the resin copolymer B contains at least one (meth)acrylic acid ester of a tertiary alcohol. These moulding compounds are distinguished inter alia by their toughness and rigidity combined with reduced water absorption. In particular, moulding compounds which contain component B2 (tertiary alkyl ester) have much smoother surfaces than those containing resin composition additives without component B2. Particularly advantageous effects are obtained both in moulding compounds consisting predominantly of polyamide A and in moulding compounds consisting predominantly of resin copolymer B although the effects obtained in the latter moulding compounds are different.

When polyamide is the predominant component, the moulding compounds are found in particular to have increased dimensional stability and reduced water absorption and shrinkage.

When resin copolymer B predominates, the main effect is to improve the chemical resistance and the heat distortion resistance of the moulding compounds. The moulding compounds are distinguished from mixtures of polyamides and resin copolymers of type B not containing (meth)acrylic acid esters of a tertiary alcohol by their excellent surfaces.

The invention further relates to polyamide moulding compounds which are tough at low temperatures, obtained from polyamides A, thermoplastic resin copolymers B and rubber polymers C, preferably graft rubbers.

The present invention thus relates to thermoplastic moulding compounds containing A) a thermoplastic polyamide,
B) a thermoplastic resin copolymer consisting of
  B1) at least one monomer selected from styrenes, α-methyl styrenes, acrylonitrile, methacrylonitrile, vinyl $C_1$ to $C_4$ carboxylic acid esters and acrylic or methacrylic acid esters of primary or secondary $C_1$ to $C_{10}$ alcohols and B2) at least one acrylic or methacrylic acid ester of tertiary $C_4$ to $C_{10}$ alcohols in quantities of up to 35% by weight in the resin copolymer B and
c) optionally a rubber polymer which increases the impact strength of the moulding compounds.

The moulding compounds may in addition contain the usual additives such as stabilizers, pigments, dyes, etc. in the usual quantities.

The moulding compounds preferably consist of 5 to 95% by weight of polyamide A and 95 to 5% by weight of resin copolymer B and optionally in addition the rubber polymer C in quantities of up to 35% by weight of C, based on the mixture of A+B+C.

The preferred moulding compounds thus contain at least 5% by weight of polyamide A, up to 95% by weight of a resin copolymer B and from 0 to 35% by weight of a rubber polymer C.

The polyamide components A of the moulding compounds according to the invention may be any partially crystalline polyamides, in particular polyamide-6 and polyamide-6,6 and partially crystalline copolyamides based on these two components. Partially crystalline polyamides in which the acid component consists in particular entirely or partly (in addition to adipic acid or caprolactam) of terephthalic acid and/or isophthalic acid and/or suberic acid and/or sebacic acid and/or azelaic acid and/or adipic acid and/or a cyclohexane dicarboxylic acid and the diamine component consists partly or completely in particular of m- and/or p-xylylene diamine and/or hexamethylene diamine and/or 2,2,4- and/or 2,4,4-trimethyl-hexamethylene diamine and/or isophorone diamine, and their compositions known in the art, may also be used.

Partially crystalline polyamides which are prepared partly or entirely from lactams containing 6 to 12 carbon atoms, optionally with the addition of 1 or more of the starting components mentioned above, may also be used.

Polyamide-6 and polyamide-6,6 as well as copolyamides containing only small proportions (up to about 10% by weight) of the co-components are particularly preferred partially crystalline polyamides A.

Amorphous polyamides may also be used as polyamide component A. These are obtained by the polycondensation of diamines, for example ethylene diamine, hexamethylene diamine, decamethylene diamine, 2,2,4- and/or 2,4,4-trimethyl-hexamethylene diamine, m- and/or p-xylylene diamine, bis-(4-aminocyclohexyl)-methane or mixtures of 4,4'-, 2,4'- and/or 2,2'-diamino-dicyclohexyl methanes, 2,2-bis-(4-aminocyclohexyl)-propane, 3,3'-dimethyl-4,4'-diamino-dicyclohexyl methane, 3-aminomethyl-3,5,5-trimethyl-cyclohexylamine, 2,5- and/or 2,6-bis-(aminomethyl)-norbornane and/or 1,4-diamino-methylcyclohexane with dicarboxylic acids, for example oxalic acid, adipic acid, azelaic acid, decanedicarboxylic acid, heptadecane dicarboxylic acid, 2,2,4- and/or 2,4,4-trimethyl adipic acid, isophthalic acid or small quantities of terephthalic acid. Amorphous copolymers obtained by the polycondensation of several monomers are, of course, also suitable, as are also copolymers which are prepared with the addition of amino carboxylic acids such as ε-aminocaproic acid, ω-aminoundecanoic acid or ω-amino-lauric acid or their lactams.

Particularly suitable amorphous polyamides are the polyamides prepared from isophthalic acid, hexamethylene diamine and other diamines, such as 4,4'-diamino-dicyclohexyl methane, isophorone diamine, 2,2,4- and/or 2,4,4-trimethyl-hexamethylene diamine and 2,5- and/or 2,6-bis-(aminomethyl)-norbornane; or from isophthalic acid, 4,4-diamino-dicyclohexyl methane and ε-caprolactam; or from isophthalic acid, 3,3'-dimethyl-4,4'-diamino-dicyclohexyl methane and lauric lactam; or from terephthalic acid and the isomeric mixture of 2,2,4- and/or 2,4,4-trimethyl-hexamethylene diamine.

Instead of using pure 4,4'-diamino-dicyclohexyl methane, there may also be used mixtures of the position isomeric diamino-dicyclohexyl methanes composed of 70 to 99 mol % of the 4,4'-diaminoisomer,
1 to 30 mol % of the 2,4'-diaminoisomer and
0 to 2 mol % of the 2,2'-diaminoisomer;

and optionally also more highly condensed diamines obtained by the hydrogenation of diamino-diphenyl methane of commercial quality. Up to 30% of the isophthalic acid may be replaced by terephthalic acid.

The polyamides A may also be used in the form of mixtures. The thermoplastic moulding compounds according to the invention contain as additional component at least one resin polymer B, preferably in quantities of from 5 to 95% by weight, in particular from 10 to 85% by weight, most preferably from 15 to 80% by weight, based on the moulding compound A+B.

The proportions in which A and B are mixed may vary within a wide range and is mainly determined by the desired properties. Mixtures containing more than 50% of resin copolymer B tend to manifest the main properties of this polymer although some properties are improved. The chemical resistance, e.g. to methanol or decalin is in many cases improved (selected resin copolymers of type B are often not stable in decalin). The surfaces undergo less deformation when exposed to chemicals and the stress crack resistance of such resins is improved. Preferred mixtures containing a predominant proportion of the resin copolymer contain from 5 to 45% by weight, preferably from 10 to 40% by weight, especially from 15 to 40% by weight of polyamide A.

Mixtures containing more than 50% of the polyamide show properties typical of the polyamide, e.g. high abrasion resistance and toughness. The water absorption, which is an undesirable property of polyamides, is reduced by the addition of resin B and the values for E modulus are in most cases increased. The toughness of the mixtures depends mainly on the proportion of component B2 in the mixture. Thermoplastic moulding compounds of A and B not containing component B2 have insufficient toughness.

Preferred mixtures consisting predominantly of polyamide contain from 5 to 45% by weight, preferably from 10 to 40% by weight, especially from 15 to 40% by weight of resin copolymer B.

Thermoplastic resin (co)polymers B for the purpose of the present invention are interpolymers of B1) at least one monomer selected from styrenes, α-methyl styrenes, acrylonitrile, methacrylontrile, vinyl $C_1$ to $C_4$ carboxylic acids and acrylic or methacrylic acid esters of primary or secondary $C_1$ to $C_{10}$ alcohols and B2) at least one acrylic or methacrylic acid ester of tertiary $C_4$ to $C_{10}$ alcohols in quantities of up to 35% by weight of B2 in the resin polymer B.

Preferred monomers B1 used as monomer starting materials for the resin polymers B are styrene, α-methyl styrene, acrylonitrile, methyl methacrylate, n-butyl methacrylate, cyclohexyl methacrylate and vinyl acetate. α-Methyl-styrene acrylonitrile and methyl methacrylate are particularly preferred.

The styrenes and α-methyl styrenes may be substituted on the aromatic ring, e.g. by $C_1$ to $C_3$ alkyl groups, halogenated $C_1$ to $C_3$ alkyl groups and/or halogen groups, but styrene and α-methyl styrene are preferred, in particular α-methyl styrene.

The monomers B2 for the purpose of this invention are tertiary (meth)acrylic acid esters corresponding to the following general formula

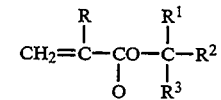

wherein R=H or $CH_3$ and $R^1$, $R^2$, $R^3$=alkyl, the sum of carbon atoms in $R^1$, $R^2$ and $R^3$ being from 3 to 9.

The following are particularly preferred monomers B2: tert.-butyl acrylate, tert.-butyl methacrylate, tert.-pentyl methacrylate and tert.-hexyl acrylate and optionally tert.-octyl (meth)acrylate.

The resin polymers B are interpolymers of at least two different monomers. They may also be used as mixtures. Components B which are particularly suitable for the purpose of this invention consist of at least two different monomers B1 and at least one monomer B2, e.g. terpolymers of at least two B1 components such as α-methyl styrene, styrene, methyl methcarylate or acrylonitrile in combination with tert.-butyl (meth)acrylate as monomer component B2.

The resin polymers B contain up to 35% by weight, preferably up to 20% by weight, of chemically incorporated monomers B2, in particular from 1 to 10% by weight, most preferably from 1.5 to 8% by weight of B2.

Particularly advantageous are terpolymers of styrene/acrylonitrile/tert.-butyl methacrylate and α-methyl styrene/acrylonitrile/tert.-butyl (meth)acrylate, especially those terpolymers of α-methyl styrene/acrylonitrile/tert.-butyl (meth)acrylate consisting of 10 to 80% by weight, preferably 30 to 75% by weight of styrene and/or α-methyl styrene and 10 to 50% by weight, preferably 20 to 40% by weight of acrylonitrile and 1 to 10% by weight, preferably 1.5 to 8% by weight of tert.-butyl (meth)acrylate (% by weight based on the sum of components B1).

The preparation of polymers B may be carried out by solvent free, solution, suspension, dispersion or emulsion copolymerisation by radical or thermal polymerisation processes. In some cases it is advantageous to work up and isolate the resin polymer B as a mixture with component C and then to mix the resulting mixture with thermoplastic polyamides to produce the moulding compounds according to the invention.

Resins B which are particularly suitable for the purpose of this invention may be produced by aqueous emulsion polymerisation, in which monomers B1 and B2 are advantageously copolymerised with the addition of anionic emulsifiers. Particularly suitable resins B are obtained when polymerisation is carried out with anionic emulsifiers of the type of carboxylic acid salts, e.g. salts of oleic acid, stearic acid, resinic acid or abietic acid or their disproportionated derivatives. For the preparation of the resin, these emulsifiers are used in the usual quantities, preferably in quantities of up to 3% by weight, based on the sum of the monomers B1 and B2.

The polymerisation to B is normally carried out at temperatures above 50° C., in particular at 60° to 100° C., and may be carried out batchwise, discontinuously or fully continuously.

Copolymerisation is initiated by heat or by radical formers such as persulphate, perphosphate, hydroperoxide, azo compounds or optionally so called redox initiators. Inorganic, water soluble initiators are particularly preferred.

The molecular weight of the polymers B may be varied by numerous means, e.g. by the temperature, the monomer concentration, the quantity of starting compound or the use of so called regulators, e.g. organic sulphur compounds such as mercaptans and disulphides, long chained mercaptans such as n- and tert.-dodecyl mercaptan being particularly suitable. The regulators are normally dissolved in the monomer mixture and the mixture is then polymerised.

Particularly advantageous moulding compounds according to the invention are obtained when B has certain molecular weights, i.e. the limiting viscosity number ($\zeta$) (Grenzviskosität), measured in dl/g at room temperature in DMF is preferably in the range of from 0.2 to 2, most preferably from 0.35 to 1.1.

The moulding compounds according to the invention may also contain, as additional component C, a rubber polymer which increases the impact strength of the moulding compounds. The addition of component C is particularly advantageous when the moulding compounds are required to have a high value for toughness at low temperatures. Preferred moulding compounds contain up to 35% by weight, e.g. 1 to 35% by weight, in particular 10 to 30% by weight of component C, based on the sum of A+B+C. Component C is a rubber polymer consisting of or containing a rubber polymer with freezing temperatures (glass transition temperatures) below 0° C., in particular below −20° C. It may be selected from homo, co or graft polymers based on diene monomer rubbers, olefine rubbers or acrylate rubbers, which may be uncross-linked or in particular partially cross-linked or highly cross-linked. Component C may be selected from known rubber polymers conventionally used for improving the properties of thermoplastic polyamides, in particular their impact strength.

The following are typical examples of this class of substances: olefine rubbers, for example diene rubbers and ethylene-propylene copolymers optionally still containing small quantities of chemically incorporated unconjugated diene monomers (so called EPDM rubbers) and especially diene monomer/acrylonitrile/copolymer rubbers, and diene polymer/vinylaryl polymer block polymers such as styrene/butadiene block copolymers.

Olefine rubbers with acid groups may also be used as components C but it may be even more advantageous to use carboxyl group-containing terpolymers of ethylene, (meth) acrylic acid and butyl acrylate.

Rubber-like copolymers of ethylene/vinylacetate and ethylene/(meth)acrylic acid alkyl esters may also be used as component C according to the invention. The ethylene copolymers with amino acrylate monomers described in GB-P 1 284 489 are also suitable. Interpolymers of olefines, acrylates and monomers which are acid or potentially acid in function, such as (meth)acrylic acid or maleic acid anhydride may also be used.

Particularly suitable components C for the purpose of this invention are rubber like graft polymers, for example graft polymers of α-olefine polymers and carboxylic acid and/or ester graft monomers suitably prepared on a graft basis of copolymers or homopolymers of ethylene, propylene and butene-(1). Suitable graft polymers are also the poly-α-olefine rubber/maleic acid anhydride adducts disclosed in patent applications DE-A 2 622 876, EP-B 13 941, DE-A 2 622 973, DE-A 2 401 149 and EP-B 9757, the reaction products of ethylene copolymers with maleic acid anhydride and dialkyl esters of maleic and fumaric acid disclosed in DE-A 3 335 706, the polyolefine rubbers (GB-P 998 439) grafted with unsaturated acids according to FR-P 1 568 637 and the maleic acid-grafted EPDM rubbers described, for example, in DE-A 2 622 973.

Graft polymers obtained by grafting styrene monomers and acrylonitrile on a rubber polymer having a glass transition temperature below 0° C., preferably below −20° C., are particularly advantageous. The graft polymers suitable for this purpose include, for example, polybutadiene, butadiene/acrylic ester copolymers, e.g. those based on butyl acrylate and/or ethylhexyl acrylate, polyacrylic acid alkyl esters, in particular those having 1 to 8 carbon atoms in the alkyl group, copolymers of butadiene, acrylic acid alkyl esters and vinyl alkyl ethers and copolymers of ethylene, propylene and a diene component. The preparation of such rubber-modified copolymers is known (e.g. from JA 48 850 or U.S. Pat. No. 4,217,424).

The graft polymers of styrene and acrylonitrile on polybutadiene or copolymers of butadiene and α,β-unsaturated monomers such as styrene, acrylonitrile or lower alkyl esters of acrylic or methacrylic acid disclosed in DE-A 2 906 222 and the known grafted acrylate rubbers are also suitable for use as component C.

The multiphase polymers described, for example, in DE-A3 200 070, composed of a highly cross-linked diene rubber as core, a first shell of cross-linked acrylate rubber (rubber with core/sheath structure) and a second shell of a polymer or copolymer of resin-forming monomers selected from styrene, acrylonitrile, methacrylonitrile, methacrylic acid esters or mixtures thereof are also particularly suitable.

Other suitable rubbers include the grafted, partially crosslinked diene and/or acrylate rubbers described in EP-A 0 134 937 and the graft products prepared according to DE-A 2 758 615 from a cross-linked rubber as graft basis. Among these rubbers, those based on polybutadiene and/or polyisoprene and containing up to 40% by weight, preferably up to 10% by weight of styrene and/or acrylonitrile and/or esters of acrylic acid as comonomers are preferred. The following are possible graft monomers: acrylonitrile, methacrylonitrile and aliphatic esters and amides of acrylic acid and methacrylic acid with up to 22 carbon atoms.

Particularly high quality moulding compounds according to the invention are obtained by using, as component C, graft polymers which are partially cross-linked and have a particulate structure. The particle sizes ($d_{50}$ values) are advantageously in the range of from 0.05 to 2 $\mu$m, particularly from 0.08 to 0.6 $\mu$m, especially from 0.15 to 0.5 $\mu$m. The rubbers used for the preparation of such graft polymers are also particulate and at least partly cross-linked and have gel contents (as a measure of the degree of cross-linking) above 30% by weight, preferably above 70% by weight. The gel contents are determined by the method of M. Hoffmann et al, Polymeranalytik I and II, Georg Thieme Verlag, Stuttgart (1977). These graft polymers have rubber contents above 20% by weight, in particular above 45% by weight, most preferably above 65% by weight, and contain rubbers selected from diene rubbers (butadiene, isoprene) and their copolymers with styrene, acrylonitrile, alkyl (meth)acrylate and vinyl ethers; and alkyl acrylate rubbers ($C_1$ to $C_8$ alkyl acrylate) and their copolymers diene monomers, styrene, acrylonitrile, alkyl methacrylate, vinyl esters and vinyl ethers. Alkyl acrylate rubbers normally contain small quantities of polyfunctional comonomers which bring about cross-linking of the acrylate rubbers; for example, divinyl benzene, diol-bis-(meth)acrylate esters, bis-acrylamides, acrylamide-methylol derivatives, trivinylbenzene, triallyl cyanurate and triallyl isocyanurate. Such rubber bases are known. Particularly suitable acrylate rubber bases have a core-sheath structure, in particular a core of diene rubber with the proportion of core amounting to 0.5 to 10% by weight, preferably 2 to 4% by weight.

The preferred monomers to be grafted on the rubber bases are alkyl methacrylate, styrene, acrylonitrile, alkyl acrylate, acrylamides, acrylic acid and methacrylic acid, in particular methyl methacrylate and combinations of methyl methacrylate and alkyl acrylates, optionally containing small proportions, i.e. from 0.2 to 5% by weight, of unsaturated carboxylic acids such as (meth)acrylic acid.

Particularly suitable graft polymers of type C have rubber contents above 45% by weight, contain rubbers with gel contents above 70% by weight, have particle sizes of from 0.15 to 0.5 $\mu$m, contain polybutadiene rubber, polybutyl acrylate rubber and corresponding core/sheath rubbers (according to DE-A 3 200 070) and contain methyl methacrylate as graft monomer, in particular in combination with alkyl acrylates, in particular mixtures of n-alkyl acrylate and tert.-alkyl acrylate. All these graft polymers may be prepared by known methods of emulsion graft polymerisation.

The polyamides A should preferably have a relative viscosity (determined on a 1% by weight solution in m-cresol at 25° C.) of from 2.0 to 5.0, preferably from 2.5 to 4.0.

The polyamide moulding compounds according to the invention may contain conventional additives such as lubricants and mould release agents, nucleating agents, stabilisers, fillers and reinforcing materials, flame retardants, dyes and thermostabilisers, antioxidants and/or light protective agents.

The moulding compounds may be prepared by mixing the components together in conventional mixing apparatus such as rollers, kneaders or single shaft or multishaft extruders.

Although in most cases all the components are preferably mixed together in one step, it may sometimes be advisable first to leave out one or even two components and then add these at a later stage. Thus the moulding compounds according to the invention may be prepared in the above mentioned mixing apparatus by melting components A, B and optionally C together and homogenising the mixture or by incorporating the graft polymer C into the molten polyamide A or the molten mixture of A and B.

The temperature employed for the preparation of the mixtures should be at least 10° C. and preferably not more than 80° C. above the melting point (or softening point in the case of non-crystalline materials) of the component which has the highest melting or softening point. In accordance with their properties, the moulding compounds according to the invention are suitable for use as injection moulded or extruded products wherever the properties described above are required, e.g. in the motor vehicle industry for shock absorbers and car body parts or as material for housings for electrical equipment.

EXAMPLES

Components used:
A. Polyamide
  A1 Polyamide 6 having a relative viscosity (determined on a 1% by weight solution in m-cresol at 25° C.) of 3.5
  A2 Polyamide 6 having a relative viscosity (determined by the method used for A1) of 3.0
  A3 Polyamide 66 having a relative viscosity (determined by the method of A1) of 3.0
  A4 Amorphous polyamide of isophthalic acid and hexamethylene diamine having a relative viscosity (determined by the method of A1) of 2.6
B Thermoplastic resin polymers (component B)

COMPARISON EXAMPLE B/A

A solution of 3723 parts by weight of water, 83 parts by weight of the sodium salt of disproportionated abietic acid and 43 parts by weight of 1N sodium hydroxide solution is introduced into a 10 liter stirrer vessel. When all the air has been displaced by nitrogen and the reaction temperature has been adjusted to 75° C., 7 parts by weight of potassium peroxydisulphate and 358 parts by weight of water are added. 1610 parts by weight of α-methyl styrene, 723 parts by weight of acrylonitrile and 2 parts by weight of t-dodecylmercaptan are then added over a period of 6 hours at 75° C. Immediately after all the components have been added, 1.2 parts by weight of potassium peroxydisulphate dissolved in 46.7 parts by weight of water are added and stirring is continued for 4 hours at 75° C.

The α-methyl styrene-acrylonitrile copolymer latex obtained is stabilised by the addition of 1.2% by weight of phenolic antioxidants, based on the quantity of polymer solids content. The latex is then coagulated at 85° to 95° C. with an aqueous solution of $MgSO_4$ (epsom salts) and acetic acid at pH 4 to 5, filtered, washed free from electrolyte and dried at 60° C.

EXAMPLES B1 to B8

The parts by weight indicated in Table 1 of water, the sodium salt of disproportionated abietic acid and 1N NaOH are introduced into a 10 liter stirrer vessel. After displacement of the air by nitrogen and heating to 75° C., the given parts by weight of α-methyl styrene, acrylonitrile, t-butyl acrylate or t-butyl methacrylate and t-dodecyl mercaptan are added at 75° C. over a period

EXAMPLES B9 to B10

The parts by weight indicated in Table 2 of water, sodium salt of disproportionated abietic acid and 1N NaOH are introduced into a 10 liter stirrer vessel. After displacement of the air by nitrogen and heating to 65° C., 10 parts by weight of potassium peroxydisulphate and 400 parts by weight of water are added.

The parts by weight shown for each example in Table 2 of styrene, acrylonitrile, t-butyl methacrylate and t-dodecyl mercaptan are then added as inflow 1 and of water, the sodium salt of disproportionated abietic acid and 1N NaOH are added as separate inflow 2 within 4 hours. Stirring is continued for 4 hours after all the components have been added. The products are stabilised and worked up as described in Examples B1 to B8.

COMPARISON EXAMPLE BB

Comparison Example BB was prepared by the process described for Examples 9 to 10. The parts by weight used are entered in Table 2.

TABLE 1

Preparation of the thermoplastic resin polymer B based on α-methyl styrene/ acrylonitrile/t-butyl (meth)acrylate used according to the invention.

| Examples | | Comparison Example BA | B1 | B2 | B3 | B4 | B5 | B6 | B7 | B8 |
|---|---|---|---|---|---|---|---|---|---|---|
| Contents of Receiver | | | | | | | | | | |
| Water | Parts by weight | 3,723 | 3,723 | 3,723 | 3,723 | 3,723 | 3,723 | 3,723 | 3,723 | 3,723 |
| Emulsifier* | Parts by weight | 83 | 83 | 83 | 83 | 83 | 83 | 83 | 83 | 83 |
| 1N NaOH | Parts by weight | 43 | 43 | 43 | 43 | 43 | 43 | 43 | 43 | 43 |
| Potassium peroxydisulphate | Parts by weight | 7 | 7 | 7 | 7 | 7 | 7 | 7 | 7 | 7 |
| Water | Parts by weight | 358 | 358 | 358 | 358 | 358 | 358 | 358 | 358 | 358 |
| Inflow | | | | | | | | | | |
| α-Methyl styrene | Parts by weight | 1,610 | 1,575 | 1,540 | 1,540 | 1,493.4 | 1,575 | 1,505 | 1,551.7 | 1,493.4 |
| Acrylonitrile | Parts by weight | 723 | 723 | 723 | 653 | 606.4 | 723 | 723 | 664.7 | 606.4 |
| t-butyl acrylate | Parts by weight | — | 35 | 70 | 140 | 233.3 | — | — | — | — |
| t-butyl methacrylate | Parts by weight | — | — | — | — | — | 35 | 105 | 116.7 | 233.3 |
| t-dodecyl mercaptan | Parts by weight | 2 | 2 | 2 | 2 | 2 | 2 | 2 | 2 | 2 |
| Additive | | | | | | | | | | |
| Potassium peroxydisulphate | Parts by weight | 1.2 | 1.2 | 1.2 | 1.2 | 1.2 | 1.2 | 1.2 | 1.2 | 1.2 |
| Water | Parts by weight | 46.7 | 46.7 | 46.7 | 46.7 | 46.7 | 46.7 | 46.7 | 46.7 | 46.7 |
| % by weight t B(M)A | | 0 | 1.5 | 3 | 6 | 10 | 1.5 | 4.5 | 5 | 10 |

*Sodium salt of disproportionated abietic acid.

of 6 hours. Immediately after all the components have been added, a solution of 1.2 parts by weight of potassium peroxydisulphate dissolved in 46.7 parts by weight of water is added and stirring is continued for a further 4 hours at 75° C.

Each of the terpolymer latices obtained is stabilised by the addition of 1.2% by weight, based on the polymer solids content, of phenolic antioxidants. The latices are then coagulated at 85° to 95° C. with an aqueous solution of $MgSO_4$ (epsom salt) and acetic acid at pH 4 to 5, filtered, washed free from electrolyte and dried at 60° C.

TABLE 2

Preparation of resin polymers B based on styrene/acrylonitrile/ t-butyl (meth)acrylate used according to the invention.

| | | Example B9 | Example B10 | Comparison Example BB |
|---|---|---|---|---|
| Contents of Receiver: | | | | |
| Water | Parts by weight | 1,700 | 1,700 | 1,700 |
| Emulsifier* | Parts by weight | 14.5 | 14.5 | 14.5 |
| 1N NaOH | Parts by | 7.5 | 7.5 | 7.5 |

TABLE 2-continued

Preparation of resin polymers B based on styrene/acrylonitrile/
t-butyl (meth)acrylate used according to the invention.

|  |  | Example B9 | Example B10 | Comparison Example BB |
|---|---|---|---|---|
| Potassium peroxydisulphate | Parts by weight | 10 | 10 | 10 |
| Water | Parts by weight | 400 | 400 | 400 |
| Inflow 1: |  |  |  |  |
| Styrene | Parts by weight | 1,428 | 1,336.5 | 1,428 |
| Acrylonitrile | Parts by weight | 567 | 486 | 567 |
| t-butyl methacrylate | Parts by weight | 30 | 202.5 | — |
| t-dodecyl mercaptan | Parts by weight | 8 | 8 | 8 |
| Inflow 2: |  |  |  |  |
| Water | Parts by weight | 1,400 | 1,400 | 1,400 |
| Emulsifier* | Parts by weight | 57.8 | 57.8 | 57.8 |
| 1N NaOH | Parts by weight | 30 | 30 | 30 |

*Sodium salt of disproportionated abietic acid.

Examples of rubber polymers (component C) which are suitable for the invention.

EXAMPLE C1

For the preparation of rubber polymer (C) by the process of emulsion polymerisation in accordance with the instructions given in DE-A 3 105 364, 14.4 parts by weight of styrene and 5.6 parts by weight of acrylonitrile are grafted on 80 parts by weight of a coarse particled rubber consisting of a butadiene graft basis in the form of a latex having an average particle diameter of 0.4 μm and a gel content of 86% by weight (gel determination according to M. Hoffmann et al, Polymeranalytik I and II, Georg Thieme Verlag, Stuttgart (1977)).

EXAMPLE C2

For the preparation of rubber polymer (C) by the process of emulsion polymerisation according to the instructions given in DE-A 3 105 364 and DE-A 3 019 233, 20 parts by weight of methyl methacrylate are grafted on 80 parts by weight of a coarse particled rubber consisting of a butadiene graft basis in latex form having an average particle diameter of 0.4 μm according to Example C1.

EXAMPLE C3

For the preparation of rubber polymer (C) by the process of emulsion polymerisation, 18 parts by weight of methyl methacrylate and 2 parts by weight of n-butyl acrylate are grafted on 80 parts by weight of a coarse particled rubber having an average particle diameter of the butadiene graft basis present in latex form as described in Example C1.

EXAMPLE C4

For the preparation of the rubber polymer (C), 18 parts by weight of methyl methacrylate and 2 parts by weight of t-butyl acrylate are grafted by the process of emulsion polymerisation on 80 parts by weight of a coarse particled rubber having an average particle diameter of the butadiene graft basis present in latex form as in Example C1.

EXAMPLE C5

To prepare the rubber polymer (C) by the process of emulsion polymerisation according to the instructions given in EP 0 134 937, 20 parts by weight of methyl methacrylate are grafted on 80 parts by weight of a coarse particled rubber in which the acrylate graft basis present in latex form has an average particle diameter of 0.5 μm. The latex is then coagulated and a further 14.3 parts by weight of methyl methacrylate are incorporated by grafting.

EXAMPLE C6

An EPM rubber grafted with 0.70% of maleic acid anhydride (Vistalon ® XX 1301 of Esso) was used.

B Preparation and testing of the moulding compounds

The polyamide component was melted in a continuously operating double shaft extruder and the thermoplastic resin copolymer B and optionally the rubber C were added to the melt and the components were homogenised in the melt. The temperature of the cylinder was chosen to maintain the substances at the temperatures shown in the tables. The melt strand was degasified before its exit from the nozzle, passed through water, granulated and dried.

Test rods measuring 80×10×4 mm were produced from the moulding compounds in a conventional injection moulding machine. The properties tested were the flexural-E-modulus (DIN 53457), the dimensional stability under heat (Vicat B) (DIN 53 460) and the impact strength and notched impact strength according to Izod (ISO 180) at different temperatures and the transition from brittle to tough was determined from the results.

The water absorption was determined gravimetrically after storage (10 days) of 3 test rods in water at 40° C.

TABLE 3

Composition and Properties of the moulding compounds according to the invention.

| | Components | | | | Properties | | | |
|---|---|---|---|---|---|---|---|---|
| | Polyamide[1] | | Thermopl. Resin Copolymer | | Impact Strength, RT kJ/m² | Water absorption % | Flexural-E- Modulus MPA | Vicat B °C. |
| Example | Type | % by weight | Type | % by weight | | | | |
| 1 (Comparison) | A 1) | 90 | B A) | 10 | 25.6 | 8.5 | 2595 | 183 |
| 2 (Comparison) | A 1) | 70 | B A) | 30 | 19.5 | 5.7 | 2973 | 143 |
| 3 (Comparison) | A 1) | 50 | B A) | 50 | 10.7 | 3.8 | 3239 | 122 |
| 4 | A 1) | 90 | B 5) | 10 | 27.3 | 8.5 | 2694 | 184 |
| 5 | A 1) | 70 | B 5) | 30 | 24.8 | 6.2 | 2997 | 153 |
| 6 | A 1) | 50 | B 5) | 50 | 16.1 | 4.2 | 3226 | 122 |
| 7 | A 1) | 70 | B 6) | 30 | 58.5 | 5.8 | 3071 | — |
| 8 | A 1) | 70 | B 7) | 30 | 72.5 | 5.9 | 3085 | — |
| 9 | A 1) | 70 | B 8) | 30 | 95.2 | 5.9 | 3091 | — |

TABLE 3-continued

Composition and Properties of the moulding compounds according to the invention.

| Example | Polyamide[1] Type | % by weight | Thermopl. Resin Copolymer Type | % by weight | Impact Strength, RT kJ/m² | Water absorption % | Flexural-E-Modulus MPA | Vicat B °C. |
|---|---|---|---|---|---|---|---|---|
| 10 (Comparison) | A 1) | 100 | — | — | not broken | 9.4 | 2600 | >200° |

[1]The reaction temperature was 260 to 270° C.

TABLE 4

Composition and properties of the moulding compounds according to the invention.

| Example | Polyamide[1]-A) Type | % by weight | Thermoplastic Resin Copolymer B Type | % by weight | Impact Strenght kJ/m² | Water Absorption % | Vicat B °C. |
|---|---|---|---|---|---|---|---|
| 11 (Comparison) | A 3) | 70 | B A) | 30 | 21.8 | 4.5 | 209 |
| 12 (Comparison) | A 3) | 50 | B B) | 50 | 15.0 | 3.4 | 141 |
| 13 | A 3) | 70 | B 1) | 30 | 33.5 | 4.6 | 193 |
| 14 | A 3) | 70 | B 2) | 30 | 39.5 | 4.6 | 204 |
| 15 | A 3) | 70 | B 3) | 30 | 48.1 | 4.7 | 202 |
| 16 | A 3) | 70 | B 4) | 30 | 75.2 | 4.7 | 201 |
| 17 | A 3) | 50 | B 9) | 50 | 17.1 | 3.3 | 136 |
| 18 | A 3) | 50 | B 10) | 50 | 30.2 | 3.3 | 138 |

[1]The reaction temperature was 275 to 285° C.

TABLE 5

Composition and properties of the moulding compounds according to the invention

| Example | Polyamide[1]-A) Type | % by weight | Thermopl. Resin Copolymer B Type | % by weight | Rubber C) Type | % by weight | Notched Impact Strength RT | −20 | −30 |
|---|---|---|---|---|---|---|---|---|---|
| 19 (Comparison) | A 1) | 60 | B A) | 15 | C 4) | 25 | 78.6 | 21.5 | — |
| 20 (Comparison) | A 2) | 50 | B A) | 20 | C 4) | 30 | 21.0 | — | — |
| 21 | A 1) | 60 | B 2) | 15 | C 4) | 25 | 84.4 | 66.8 | 40.5 |
| 22 | A 1) | 60 | B 3) | 15 | C 4) | 25 | 83.3 | 67.1 | 43.0 |
| 23 | A 2) | 50 | B 5) | 20 | C 4) | 30 | 22.4 | — | — |
| 24 | A 2) | 50 | B 6) | 20 | C 4) | 30 | 80.3 | 72.8 | 26.5 |
| 25 | A 2) | 50 | B 7) | 20 | C 4) | 30 | 79.9 | — | 63.5 |
| 26 | A 2) | 50 | B 3) | 20 | C 1) | 30 | 60.7 | 22.0 | — |
| 27 | A 1) | 60 | B 3) | 15 | C 2) | 25 | 84.8 | 26.5 | — |
| 28 | A 1) | 60 | B 2) | 15 | C 3) | 25 | 84.4 | 28.3 | — |
| 29 | A 2) | 50 | B 3) | 20 | C 5) | 30 | 23.0 | — | — |
| 30 | A 1) | 60 | B 2) | 15 | C 6) | 25 | 83.6 | 67.9 | 48.2 |

TABLE 6

Composition and properties of the moulding components according to the invention

| Example | Polyamide[1] A Type | % by weight | Thermopl. Resin Copolymer B Type | % by weight | Impact Strength RT kJ/m² | Water Absorption % |
|---|---|---|---|---|---|---|
| 31 (Comparison) | A 4 | 90 | B A | 10 | 108.0 | 4.58 |
| 32 (Comparison) | A 4 | 70 | B A | 30 | 66.9 | 4.14 |
| 33 | A 4 | 90 | B 1 | 10 | 123.6 | 4.85 |
| 34 | A 4 | 70 | B 1 | 30 | 83.4 | 4.17 |

The toughness of the moulding compounds may be further improved by the addition of a rubber C and/or the use of resin copolymer B having a higher content of B2.
[1]The temperature was 285 to 290° C.

We claim:

1. Thermoplastic moulding compounds comprising
A) 5 to 95% by weight of a thermoplastic polyamide,
B) 95 to 5% by weight of a thermoplastic resin ester copolymer prepared from monomers consisting of B1) at least on monomer selected from styrenes, α-methyl styrenes, acrylonitrile, or methacrylonitrile, and
B2) tert.butyl (meth)acrylate in quantities from 1 up to 20% by weight in the resin copolymer B) and c) up to 35% by weight of a rubber polymer for increasing the impact strength of the moulding compound.

2. The thermoplastic moulding compound as claimed in claim 1, wherein component B is present in an amount from 80 to 15% by weight.

3. The thermoplastic moulding compound as claimed in claim 1, wherein the compounds consists essentially of components A), B) and C).

4. Moulding compounds according to claim 1, characterised in that the resin polymers B) are copolymerised mixtures of two monomers B1) selected from styrene, α-methyl styrene and acrylonitrile and from 1 to 20%, by weight of tert.-butyl (meth)acrylate as monomer B2).

5. Moulding compounds according to claim 1, characterised in that component C) consists of homo-, co- or graft polymers based on diene monomer rubbers, olefine rubbers or acrylate rubbers.

6. Moulding compounds according to claim 1, wherein the thermoplastic polyamide (A) is either polyamide-6 or polyamide-6,6.

7. Moulding compounds as claimed in claim 1, wherein the polyamide (A) is from 5 to 45% by weight.

8. Moulding compounds as claimed in claim 1, wherein the polyamide (A) is from 10 to 40% by weight.

9. Moulding compounds as claimed in claim 1, wherein the polyamide (A) is from 15 to 40% by weight.

10. Thermoplastic moulding compound as claimed in claim 1, wherein there is 30 to 75 % by weight of styrene or α-methylstyrene or a mixture thereof; 20 to 40% by weight of acrylonitrile and 1.5 to 8% by weight of tert-butyl(meth)acrylate wherein the percentage by weight is based on the total amount of (B).

11. Moulding compounds as claimed in claim 1, wherein the particle size of component (C) is from 0.15 to 0.5 μm.

12. Moulding compounds as claimed in claim 1, wherein the copolymer (B) is from 15 to 45% by weight.

13. Moulding compounds as claimed in claim 1, wherein the resin polymers (B) contain from 1 to 10% by weight of chemically incorporated monomers (B2).

14. Moulding compounds as claimed in claim 1, wherein the resin polymers (B) contain from 1.5 to 8% by weight of chemically incorporated monomers (B2).

15. Thermoplastic moulding compounds comprising:
A) 10 to 95% by weight of a thermoplastic polyamide,
B) 95 to 10% by weight of a thermoplastic resin ester copolymer prepared from monomers consisting of
B1) at least on monomer selected from styrenes, α-methyl styrenes, acrylonitrile, or methacrylonitrile and
B2) tert.butyl(meth)acrylate in quantities from 1 up to 20% by weight in the resin copolymer B) and
c) up to 35% by weight of a rubber polymer for increasing the impact strength of the moulding compound.

16. Thermoplastic moulding compounds consisting of
A) 5 to 95% by weight of a thermoplastic polyamide,
B) 95 to 5% by weight of a thermoplastic resin ester copolymer prepared from monomers consisting of
B1) at least on monomer selected from styrenes, α-methyl styrenes, acrylonitrile, methacrylonitrile, vinyl $C_1$ to $C_4$ carboxylic acid esters and acrylic or methacrylic acid esters of primary or secondary $C_1$ to $C_{10}$ alcohols and
B2) at least one acrylic or methacrylic acid ester of tertiary $C_4$ to $C_{10}$ alcohols in quantities from 1 up to 20% by weight in the resin copolymer B) and
c) up to 35% by weight of a rubber polymer for increasing the impact strength of the moulding compound.

17. Moulding compounds as claimed in claim 16, wherein the copolymer (B) is from 5 to 45% by weight.

18. Moulding compounds as claimed in claim 16, wherein the copolymer (B) is from 10 to 40% by weight.

19. The thermoplastic moulding compound as claimed in claim 16, wherein component B is present in an amount from 80 to 15% by weight.

* * * * *